United States Patent
Yang et al.

(10) Patent No.: US 9,030,974 B2
(45) Date of Patent: May 12, 2015

(54) TRANSMISSION METHOD AND RECEPTION METHOD FOR DOWNLINK SIGNAL, USER EQUIPMENT, AND BASE STATION

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 13/985,850

(22) PCT Filed: Mar. 21, 2012

(86) PCT No.: PCT/KR2012/002007
§ 371 (c)(1),
(2), (4) Date: Aug. 15, 2013

(87) PCT Pub. No.: WO2012/128546
PCT Pub. Date: Sep. 27, 2012

(65) Prior Publication Data
US 2013/0322304 A1    Dec. 5, 2013

Related U.S. Application Data

(60) Provisional application No. 61/454,998, filed on Mar. 21, 2011, provisional application No. 61/603,891, filed on Feb. 27, 2012, provisional application No. 61/603,955, filed on Feb. 28, 2012.

(51) Int. Cl.
*H04B 7/00* (2006.01)
*H04J 3/00* (2006.01)
*H04L 5/14* (2006.01)
(Continued)

(52) U.S. Cl.
CPC ........... *H04W 72/042* (2013.01); *H04L 1/0031* (2013.01); *H04L 1/0073* (2013.01); *H04L 5/001* (2013.01); *H04L 1/1861* (2013.01)

(58) Field of Classification Search
CPC .............. H04B 1/50; H04B 1/56; H04B 1/52; H04W 88/187; H04W 74/04
USPC .................................. 370/277, 280, 294, 314
See application file for complete search history.

(56) References Cited

U.S. PATENT DOCUMENTS

| 2002/0172163 | A1* | 11/2002 | Chen et al. | 370/281 |
| 2009/0185632 | A1* | 7/2009 | Cai et al. | 375/260 |
| 2012/0287828 | A1* | 11/2012 | Chen et al. | 370/280 |

FOREIGN PATENT DOCUMENTS

| KR | 10-2010-0052646 | 5/2010 |
| WO | 2010/048178 | 4/2010 |

(Continued)

OTHER PUBLICATIONS

PCT International Application No. PCT/KR2012/002007, Written Opinion of the International Searching Authority dated Oct. 12, 2012, 20 pages.

*Primary Examiner* — Ronald B Abelson
(74) *Attorney, Agent, or Firm* — Lee, Hong, Degerman, Kang & Waimey

(57) ABSTRACT

The present invention provides a DL grant transmission/reception measure for a cross-CC scheduling, when cells operating in different TDD DL-UL configurations from each other are merged. In addition, the present invention provides a measure for transmitting/receiving uplink ACK/NACK information for DL data transmitted according the DL grant.

12 Claims, 15 Drawing Sheets

(51) Int. Cl.
*H04W 4/00* (2009.01)
*H04W 72/04* (2009.01)
*H04L 5/00* (2006.01)
*H04L 1/18* (2006.01)
*H04L 1/00* (2006.01)

(56) References Cited

FOREIGN PATENT DOCUMENTS

WO 2010/105254 9/2010
WO 2011/018024 2/2011

* cited by examiner

FIG. 7

| CC | DL-UL Configuration | Subframe Number(SFN) | | | | | | | | | |
|---|---|---|---|---|---|---|---|---|---|---|---|
| | | 0 | 1 | 2 | 3 | 4 | 5 | 6 | 7 | 8 | 9 |
| Scheduling CC | 1 | D | S | U | U | D | D | S | U | U | D |
| Scheduled CC | 2 | D | S | U | D | D | D | S | U | D | D |

FIG. 8

Case 1:

| CC | SFN | |
|---|---|---|
| | K-i | K |
| Scheduling CC | D(S) | U |
| Scheduled CC | D(S) | D |

Case 2:

| CC | SFN | | | |
|---|---|---|---|---|
| | K-i-1 | K-i | K | K+1 |
| Scheduling CC | D(S) | D(S) | U | U |
| Scheduled CC | D(S) | D(S) | D | D |

Case 3:

| CC | SFN | | | | | |
|---|---|---|---|---|---|---|
| | K-i-2 | K-i-1 | K-i | K | K+1 | K+2 |
| Scheduling CC | D(S) | D(S) | D(S) | U | U | U |
| Scheduled CC | D(S) | D(S) | D(S) | D | D | D |

Case 4:

| CC | SFN | | | | |
|---|---|---|---|---|---|
| | K-i-1 | K-i | K | K+1 | K+2 |
| Scheduling CC | D(S) | D(S) | U | U | U |
| Scheduled CC | D(S) | D(S) | D | D | D |

| Scheduling SFN | Scheduled SFN | | | |
|---|---|---|---|---|
| | K-i-1 | K-i | K | K+1 |
| K-i-1 | O | X | O | X |
| K-i | X | O | X | O |

(b)

| Scheduling SFN | Scheduled SFN | | | |
|---|---|---|---|---|
| | K-i-1 | K-i | K | K+1 |
| K-i-1 | O | X | X | O |
| K-i | X | O | O | X |

FIG. 10

| Scheduling SFN | Scheduled SFN | | | | | |
|---|---|---|---|---|---|---|
| | K-i-2 | K-i-1 | K-i | K | K+1 | K+2 |
| K-i-2 | O | X | X | O | X | X |
| K-i-1 | X | O | X | X | O | X |
| K-i | X | X | O | X | X | O |

| Scheduling SFN | Scheduled SFN | | | | |
|---|---|---|---|---|---|
| | K-i-1 | K-i | K | K+1 | K+2 |
| K-i-1 | O | X | O | O | X |
| K-i | X | O | X | X | O |

(b)

| Scheduling SFN | Scheduled SFN | | | | |
|---|---|---|---|---|---|
| | K-i-1 | K-i | K | K+1 | K+2 |
| K-i-1 | O | X | O | X | X |
| K-i | X | O | X | O | O |

TRANSMISSION METHOD AND RECEPTION METHOD FOR DOWNLINK SIGNAL, USER EQUIPMENT, AND BASE STATION

CROSS-REFERENCE TO RELATED APPLICATIONS

This application is the National Stage filing under 35 U.S.C. 371 of International Application No. PCT/KR2012/002007, filed on Mar. 21, 2012, which claims the benefit of U.S. Provisional Application Ser. Nos. 61/454,998, filed on Mar. 21, 2011, 61/603,891, filed Feb. 27, 2012, and 61/603,955, filed Feb. 28, 2012, the contents of which are all hereby incorporated by reference herein in their entireties.

TECHNICAL FIELD

The present invention relates to a wireless communication system. Particularly, the present invention relates to a method and apparatus for transmitting/receiving a downlink grant for downlink data scheduling.

BACKGROUND ART

A general wireless communication system transmits/receives data through one downlink (DL) band and through one uplink (UL) band corresponding to the DL band (in case of Frequency Division Duplex (FDD) mode), or divides a prescribed radio frame into UL time unit(s) and DL time unit(s) in a time domain and transmits/receives data through the UL/DL time unit(s) (in case of Time Division Duplex (TDD) mode). A Base Station (BS) and a User Equipment (UE) transmit and receive data and/or control information scheduled on a prescribed time unit basis, i.e. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe.

Meanwhile, to use a wider frequency band in a recent wireless communication system, introduction of carrier aggregation (or bandwidth aggregation) technology that uses a wider UL/DL bandwidth by aggregating a plurality of UL/DL frequency blocks has been discussed.

FIG. 1 illustrates an example of performing communication in a multicarrier situation.

A multicarrier system or Carrier Aggregation (CA) system refers to a system using a wide bandwidth by aggregating a plurality of carriers each having a narrower bandwidth than the target bandwidth. The CA system is different from an Orthogonal Frequency Division Multiplexing (OFDM) system in that DL or UL communication is performed using a plurality of carrier frequencies, whereas the OFDM system up-converts a base frequency band, which is divided into a plurality of orthogonal subcarriers, into a single carrier frequency to perform DL or UL communication. When a plurality of carriers each having a narrower bandwidth than a target bandwidth is aggregated, the bandwidth of each of the aggregated carriers may be limited to a bandwidth used in a legacy system in order to ensure backward compatibility with the legacy system. For example, the legacy system supports bandwidths of 1.4, 3, 5, 10, 15, and 20 MHz and the LTE-Advanced (LTE-A) system evolved from the LTE system may support a bandwidth wider than 20 MHz using only bandwidths supported in the LTE system. Alternatively, CA may be supported by defining a new bandwidth irrespective of the bandwidths used in the legacy system. The term multicarrier is used interchangeably with the term Carrier Aggregation (CA) or bandwidth aggregation. Contiguous CA and non-contiguous CA are collectively referred to as CA. For reference, when only one Component Carrier (CC) is used for communication in TDD or when only one UL CC and one DL CC are used for communication in FDD, this corresponds to communication under a single carrier situation (non-CA).

DISCLOSURE

Technical Problem

In multicarrier aggregation in which a plurality of aggregated carriers is used for communication between a BS and a UE, a communication method using a single carrier cannot be applied to communication using multiple carriers. A new communication method suitable for communication using a plurality of carriers while minimizing an effect on a legacy system should be defined.

It will be appreciated by persons skilled in the art that that the technical objects that can be achieved through the present invention are not limited to what has been particularly described hereinabove and other technical objects of the present invention will be more clearly understood from the following detailed description.

Technical Solution

In an aspect of the present invention, provided herein is a method for receiving, by a user equipment in which a plurality of cells is configured, a downlink signal from a base station. The method comprises: receiving control information about downlink data assigned in a downlink subframe D2 of a second cell among the plurality of cells and indication information indicating the downlink subframe D2 from the base station in a downlink subframe D1 of a first cell among the plurality of cells, and receiving the downlink data through the second cell in the downlink subframe D2 from the base station according to the control information and the indication information. The first cell and the second cell have different Time Division Duplex (TDD) configurations and the downlink subframe D1 is equal to or precedes the downlink subframe D2 in a time domain.

In another aspect of the present invention, provided herein is a method for transmitting, by a base station, a downlink signal to a user equipment in which a plurality of cells is configured. The method comprises: transmitting control information about downlink data assigned in a downlink subframe D2 of a second cell among the plurality of cells and indication information indicating the downlink subframe D2 to the user equipment in a downlink subframe D1 of a first cell among the plurality of cells, and transmitting the downlink data through the second cell in the downlink subframe D2 to the user equipment according to the control information and the indication information. The first cell and the second cell have different Time Division Duplex (TDD) configurations and the downlink subframe D1 is equal to or precedes the downlink subframe D2 in a time domain.

In another aspect of the present invention, provided herein is a user equipment in which a plurality of cells is configured, for receiving a downlink signal from a base station. The user equipment comprises: a Radio Frequency (RF) unit configured to transmit and receive a radio signal and a processor configured to control the RF unit. The processor controls the RF unit to receive control information about downlink data assigned in a downlink subframe D2 of a second cell among the plurality of cells and indication information indicating the downlink subframe D2 from the base station in a downlink subframe D1 of a first cell among the plurality of cells and controls the RF unit to receive the downlink data through the second cell in the downlink subframe D2 from the base station according to the control information and the indication information. The first cell and the second cell have different Time Division Duplex (TDD) configurations, and the downlink subframe D1 is equal to or precedes the downlink subframe D2 in a time domain.

In another aspect of the present invention, provided herein is a base station for transmitting a downlink signal to a user equipment in which a plurality of cells is configured. The base station comprises: a Radio Frequency (RF) unit configured to transmit and receive a radio signal and a processor configured to control the RF unit. The processor controls the RF unit to transmit control information about downlink data assigned in a downlink subframe D2 of a second cell among the plurality of cells and indication information indicating the downlink subframe D2 to the user equipment in a downlink subframe D1 of a first cell among the plurality of cells and controls the RF unit to transmit the downlink data through the second cell in the downlink subframe D2 to the user equipment according to the control information and the indication information. The first cell and the second cell have different Time Division Duplex (TDD) configurations, and the downlink subframe D1 is equal to or precedes the downlink subframe D2 in a time domain.

In each aspect of the present invention, the downlink subframe D1 may be configured such that two or more downlink control channels respectively corresponding to two or more downlink subframes of the second cell or one downlink control channel for the two or more downlink subframes of the second cell may be received therein.

In each aspect of the present invention, ACKnowledgement (ACK)/Negative ACK (NACK) for the downlink data received in the downlink subframe D2 indicated by the indication information may be transmitted to the base station. The ACK/NACK may be located at an end part or a front part of ACK/NACK information configured for the second cell It will be appreciated by persons skilled in the art that that the effects that can be achieved through the present invention are not limited to what has been particularly described hereinabove and other advantages of the present invention will be more clearly understood from the following detailed description.

Advantageous Effects

According to the present invention, more effective transmission/reception of scheduling information for DL data can be performed in a situation in which a plurality of carriers is aggregated and a cross-carrier scheduling is configured between the aggregated carriers.

In addition, according to the present invention, more effective transmission/reception of ACKnowledgement (ACK)/Negative ACK (NACK) for DL data can be performed in a situation in which a plurality of carriers is aggregated and cross-carrier scheduling is configured between the aggregated carriers.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 7 illustrates an exemplary scheduling CC and scheduled CC having different TDD DL-UL configurations;

FIG. 8 illustrates exemplary cases generated between a frame of a scheduling CC and a frame of a scheduled CC when a scheduling CC and a scheduled CC having different TDD DL-UL configurations are combined;

FIG. 9 illustrates an example of applying Method 2 of the present invention to Case 2 of FIG. 8;

FIG. 10 illustrates an example of applying Method 2 of the present invention to Case 3 of FIG. 8;

FIG. 11 illustrates an example of applying Method 2 of the present invention to Case 4 of FIG. 8;

BEST MODE

Figure 1:
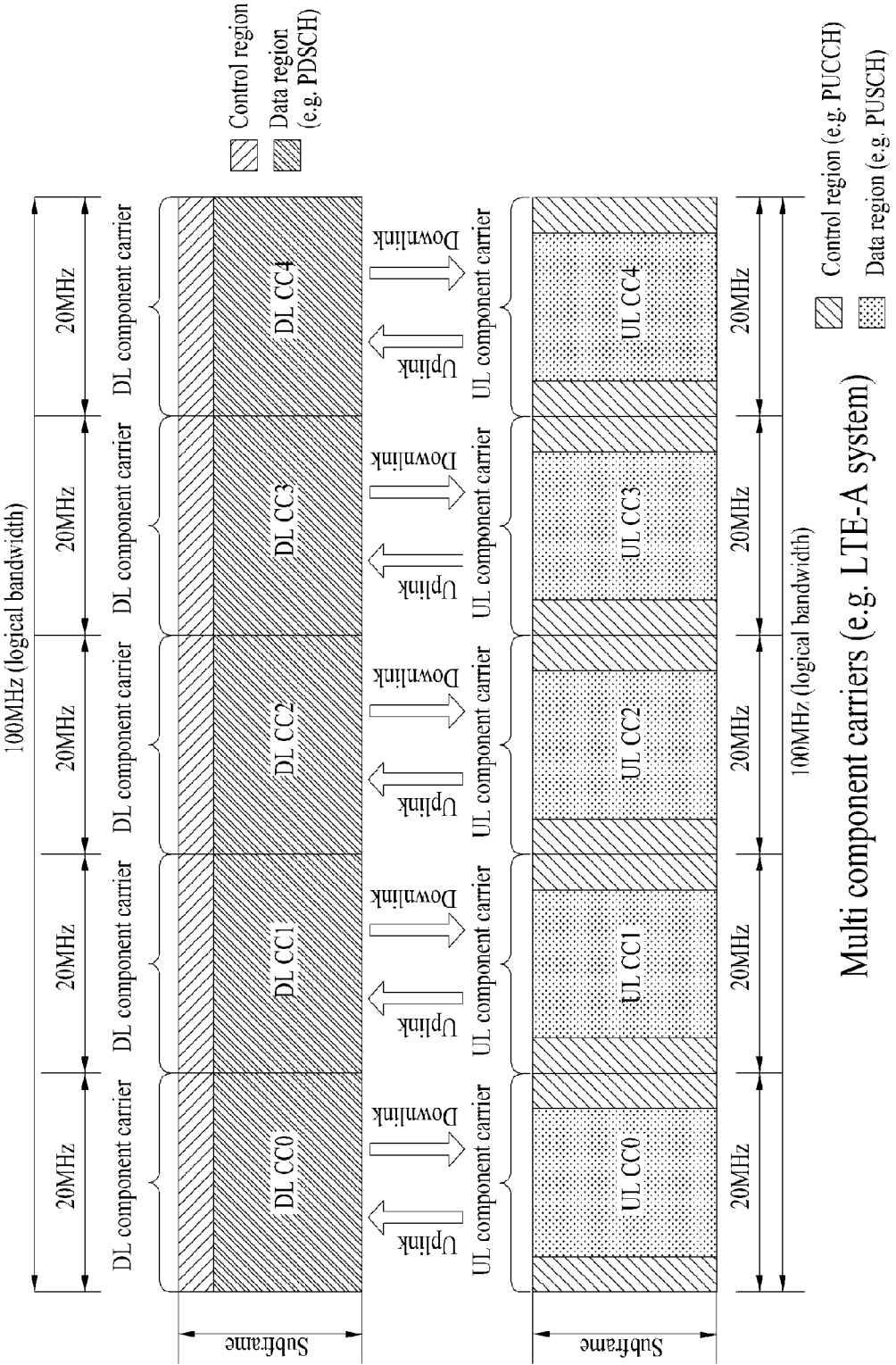
FIG. 1 illustrates an example of performing communication in a multicarrier situation.

Hereinafter, the exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from becoming ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, a User Equipment (UE) may be a fixed or mobile device. Examples of the UE include various devices that transmit and receive user data and/or various kinds of control information to and from a base station. The UE may be referred to as a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. In addition, in the present invention, a Base Station (BS) means a fixed station that performs communication with a UE and/or another BS, and exchanges various kinds of data and control information with the UE and another BS. The BS may be referred to as an Advanced Base Station (ABS), a Node-B (NB), an Evolved-NodeB (eNB), a Base Transceiver System (BTS), an Access Point (AP), or a Processing Server (PS).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or Resource Elements (REs) carrying Downlink Control Information (DCI), a set of time-frequency resources or REs carrying Control Format Indicator (CFI), a set of time-frequency resources or REs carrying downlink ACK/NACK, and a set of time-frequency resources or REs carrying DL data, respectively. In addition, a Physical Uplink Control CHannel (PUCCH), a Physical Uplink Shared CHannel (PUSCH), and a Physical Random Access CHannel) (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, a time-frequency resource or RE that is assigned to or belongs to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission on PDCCH/PCFICH/PHICH/PDSCH, respectively.

Figure 2:
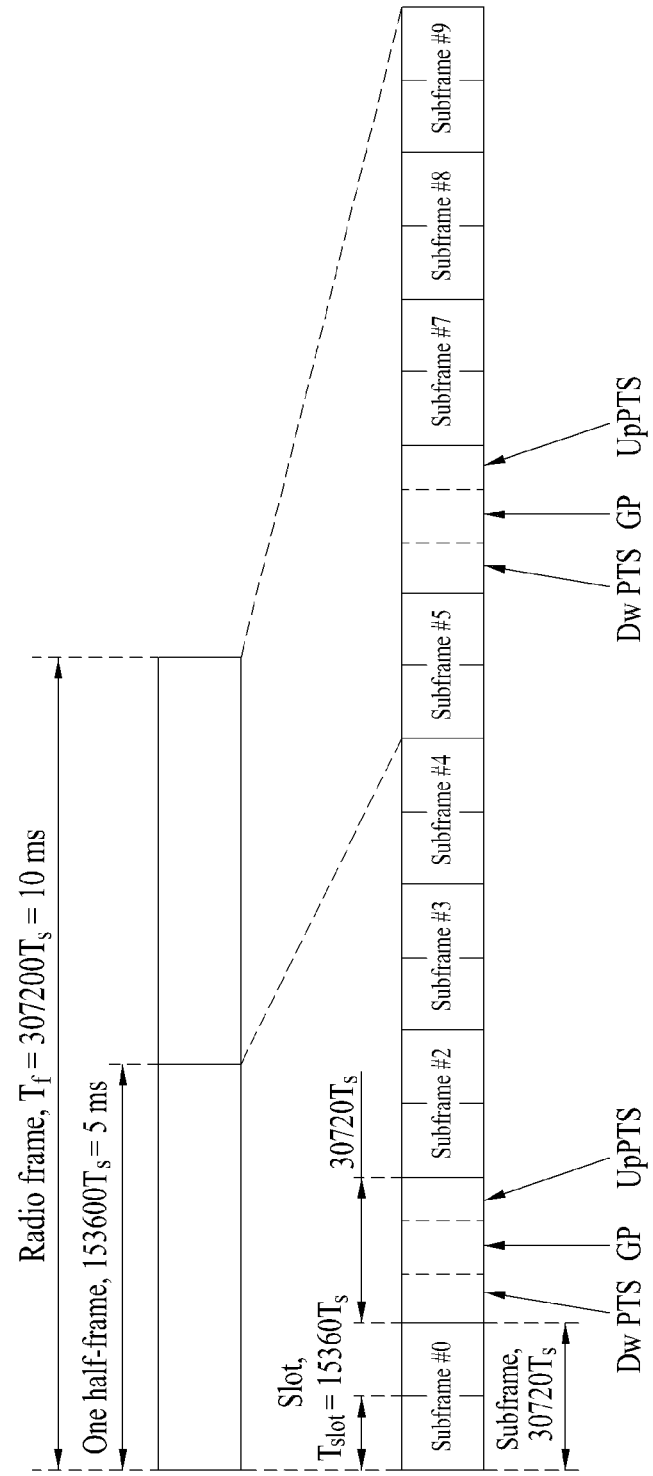
FIG. 2 illustrates an exemplary structure of a radio frame used in a wireless communication system.

FIG. 2 illustrates an exemplary structure of a radio frame used in a wireless communication system.

denotes sampling time, where $T_s=1/(2048\times15\ \text{kHz})$. Each subframe is 1 ms long and further divided into two slots. 20 slots are sequentially numbered from 0 to 19 in a radio frame. Duration of each slot is 0.5 ms. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may have different configurations according to duplex mode. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Particularly, FIG. 2 illustrates a TDD frame structure used in 3GPP LTE(-A). Table 1 shows exemplary DL-UL configurations for subframes in a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D is a DL subframe, U is a UL subframe, and S is a special subframe. The special subframe includes three fields, i.e., Downlink Pilot Time Slot (DwPTS), Guard Period (GP), and Uplink Pilot Time Slot (UpPTS). DwPTS is a time period reserved for DL transmission and UpPTS is a time period reserved for UL transmission. Table 2 shows an exemplary special frame configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
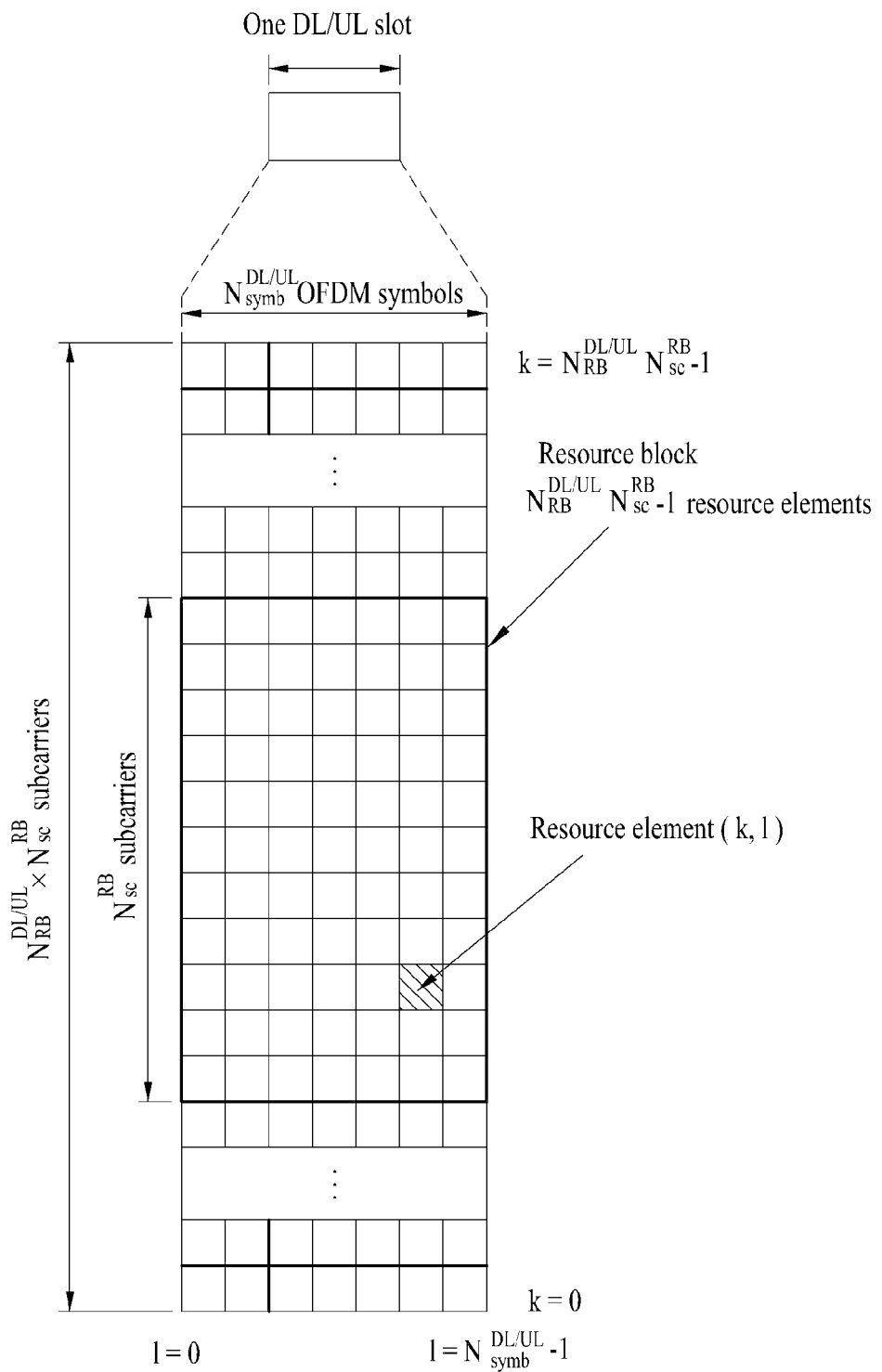
FIG. 3 illustrates an exemplary structure of a DL/UL slot in a wireless communication system.

Referring to FIG. 2, a 3GPP LTE(-A) radio frame is 10 ms ($307,200T_s$) in duration. The radio frame is divided into 10 subframes of equal size. Subframe numbers may be assigned to the 10 subframes within the radio frame, respectively. $T_s$ FIG. 3 illustrates an exemplary structure of a DL/UL slot in a wireless communication system. Specifically, FIG. 3 illustrates the structure of a resource grid in a 3GPP LTE(-A) system.

Referring to FIG. 3, a slot includes a plurality of OFDM symbols in the time domain and a plurality of Resource Blocks (RBs) in the frequency domain. An OFDM symbol may refer to one symbol duration. An RB includes a plurality of subcarriers in the frequency domain. An OFDM symbol may also be called an SC-FDM symbol etc. according to a multiple access scheme. The number of OFDM symbols per slot may vary depending on channel bandwidth and CP length. For instance, one slot includes 7 OFDM symbols in case of a normal CP, whereas one slot includes 6 OFDM symbols in case of an extended CP. While a subframe is shown in FIG. 2 as having a slot with 7 OFDM symbols for convenience of description, embodiments of the present invention are also applicable to subframes with any other number of OFDM symbols. A resource including one OFDM symbol and one subcarrier is referred to as a Resource Element (RE) or a tone.

Referring to FIG. 3, a signal transmitted in each slot may be expressed by a resource grid including $N^{DL/UL}_{RB} \cdot N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. Each OFDM symbol includes $N^{DL/UL}_{RB} \cdot N^{RB}_{sc}$ subcarriers. The number of subcarriers per carrier is determined by the size of Fast Fourier Transform (FFT). Subcarriers may be divided into data subcarriers for data transmission, reference signal subcarriers for reference signal transmission, and null subcarriers for a guard band and a Direct Current (DC) component. The null carriers for the DC component are unused remaining subcarriers and are mapped to a carrier frequency $f_0$ in a process of generating an OFDM signal. The carrier frequency is also referred to as a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB. An RB is defined as $N^{DL/UL}_{symb}$ (e.g. 7) consecutive OFDM symbols or SC-FDMA symbols in the time domain and $N^{RB}_{sc}$ (e.g. 12) consecutive subcarriers in the frequency domain. Therefore, one PRB includes $N^{DL/UL}_{symb} \cdot N^{RB}_{sc}$ REs. Each RE in the resource grid may be uniquely identified by an index pair (k,l) in a slot. k is a frequency-domain index ranging from 0 to $N^{DL/UL}_{RB} \cdot N^{RB}_{sc} - 1$ and l is a time-domain index ranging from 0 to $N^{DL/UL}_{symb} - 1$.

Figure 4:
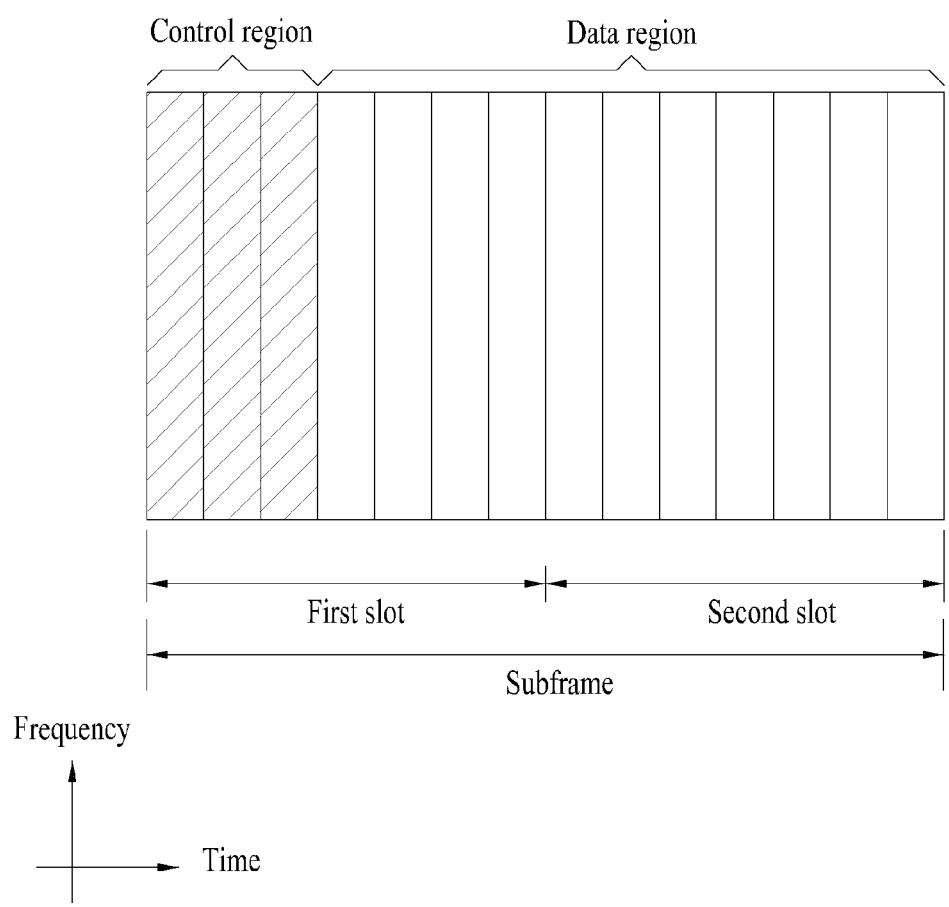
FIG. 4 illustrates an exemplary structure of a DL subframe used in a 3GPP LTE(-A) system.

FIG. 4 illustrates an exemplary structure of a DL subframe used in a 3GPP LTE(-A) system.

Referring to FIG. 4, a DL subframe may be divided into a control region and a data region. The control region includes one or more OFDM symbols, starting from the first OFDM symbol. In the DL subframe of the 3GPP LTE(-A) system, the control region is configured as a region in which a PDCCH can be transmitted. Accordingly, the control region in the DL subframe is also referred to as a PDCCH region. The number of OFDM symbols used for the control region in the DL a subframe may be independently configured on a subframe basis and signaled through a PCFICH. A BS may transmit control information to a UE or UEs in the control region. To transmit control information, a PDCCH, a PCFICH, a PHICH, etc. may be allocated to the control region.

The BS may transmit information related to resource assignment of a Paging CHannel (PCH) and a DL Shared CHannel (DL-SCH) that are transport channels, a UL scheduling grant (hereinafter, UL grant), a DL scheduling grant (hereinafter, DL grant), HARQ information, a Downlink Assignment Index (DAI), a Transmit Power Control (TPC) command, etc. to each UE or UE group on a PDCCH. Information related to resource assignment carried by a PDCCH may include RB assignment information, i.e. frequency resource information, used for UL/DL transmission. The BS may allocate frequency resources for a UE through the PDCCH.

The BS may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH and thus read data received on the PDSCH. The size and usage of control information transmitted on a PDCCH may vary according to Downlink Control Information (DCI) formats and the size of the control information may vary according to coding rates. For example, among the DCI formats, DCI formats (e.g. DCI formats 1/1A/1B/1D/2/2A/2B/2C) used for DL data scheduling include a Carrier Indicator Field (CIF), an RB assignment field, a Modulation and Coding Scheme (MCS) field, an HARQ processor number field, a New Data Indicator (NDI) field, and a Redundancy Version (RV) field and further include a Downlink Assignment Index (DAI) field in case of TDD.

Information indicating to which UE or UE group PDSCH data is transmitted and information indicating how the UE or UE group should receive and decode the PDSCH data are transmitted on the PDCCH. For example, it is assumed that a specific PDCCH is CRC-masked with a Radio Network Temporary Identity (RNTI) 'A' and information about data transmitted using a radio resource 'B' (e.g. frequency location) and using transport format information 'C' (e.g. transmission block size, modulation scheme, coding information, etc.) is transmitted through a specific DL subframe. Then, the UE monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Basically, the UE does not know the location at which a PDCCH thereof is transmitted. Therefore, the UE performs blind detection (referred also to as blind decoding) for all PDCCHs of a corresponding DCI format in every subframe until a PDCCH having an identity thereof is received.

Figure 5:
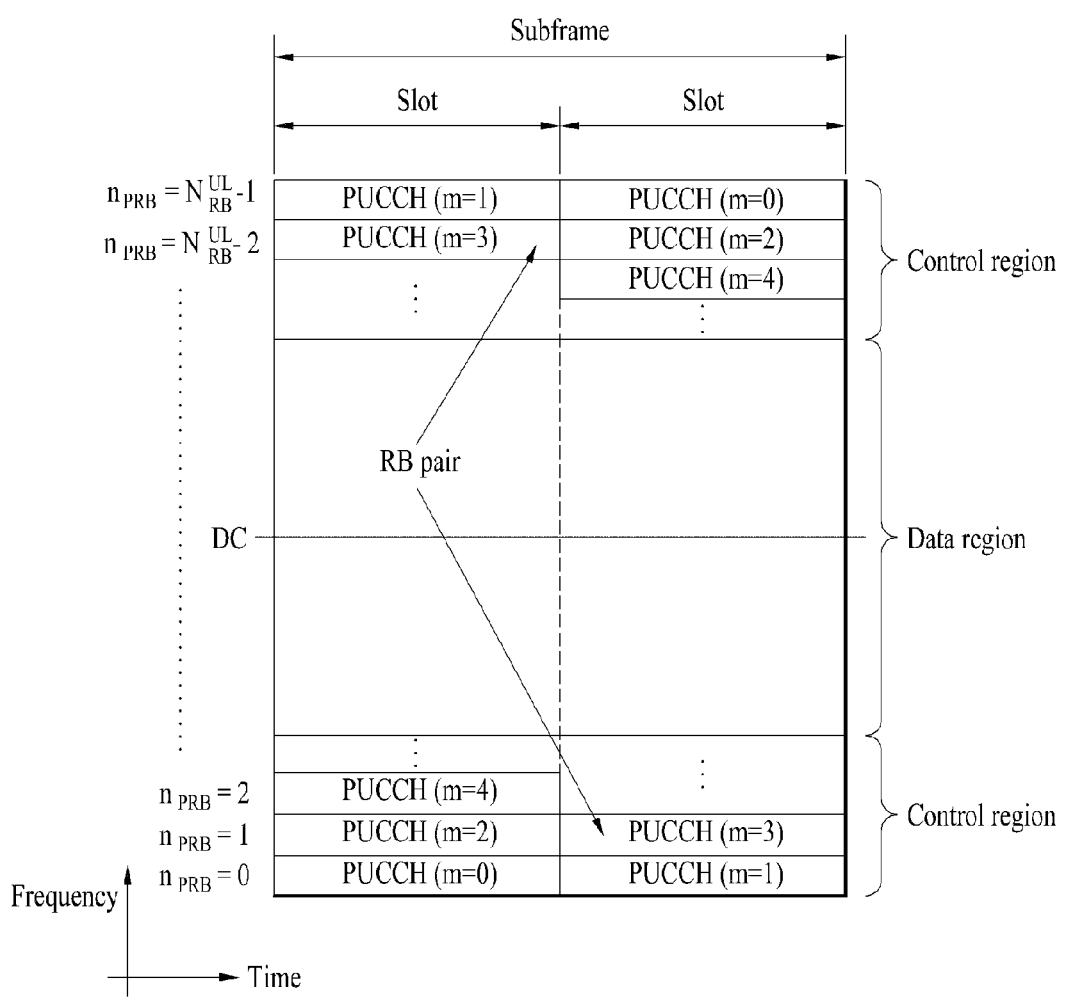
FIG. 5 illustrates an exemplary structure of a UL subframe in a 3GPP LTE(-A) system.

FIG. 5 illustrates an exemplary structure of a UL subframe in a 3GPP LTE(-A) system.

Referring to FIG. 5, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. If a UE adopts SC-FDMA for UL transmission, it cannot transmit a PUCCH and a PUSCH simultaneously on a single carrier in order to maintain single carrier characteristics.

In a UL subframe, subcarriers distant from a DC subcarrier are used as the control region. In other words, subcarriers located at both ends of a UL transmission bandwidth are assigned for UCI transmission. The DC subcarrier is reserved without being used for signal transmission and is mapped to a carrier frequency $f_0$ in a frequency up-conversion process performed by an OFDM/SC-FDM signal generator.

A PUCCH for a UE is allocated to an RB pair, which belongs to resources operating in a carrier frequency, in a subframe. The RBs of the RB pair occupy different subcarriers in two slots. This is called frequency hopping of an RB pair allocated to a PUCCH over a slot boundary. However, if frequency hopping is not used, an RB pair occupies the same subcarriers. Irrespective of frequency hopping, a PUCCH for one UE is assigned to an RB pair in one subframe and therefore the same PUCCH is transmitted once through one RB in each slot, a total of two times, in one UL subframe. The UE is assigned a PUCCH resource for UCI transmission by the BS through higher layer signaling, an explicit scheme, or an implicit scheme.

The size and usage of UCI transmitted on a PUCCH may vary according to PUCCH formats and the size of the UCI may vary according to coding rate. For example, the following PUCCH format may be defined.

TABLE 3

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

In Table 3, PUCCH format 3 has been newly introduced in 3GPP LTE release-10 in order to efficiently transmit increased UCI.

Meanwhile, as described with reference to FIG. 1, CA or bandwidth aggregation technology has recently been discussed. For example, referring to FIG. 1, five CCs, each of 20 MHz, may be aggregated on each of UL and DL to support a bandwidth of 100 MHz. The respective CCs may be contiguous or non-contiguous in the frequency domain. For convenience, FIG. 1 shows the case in which the bandwidth of a UL CC is the same as the bandwidth of a DL CC and the two are symmetrical. However, the bandwidth of each CC may be independently determined. It is also possible to configure asymmetric CA in which the number of UL CCs is different from the number of DL CCs. A UL CC and a DL CC may also be referred to as UL resources and DL resources, respectively. Even when a BS manages X DL CCs, a frequency bandwidth which can be received by a specific UE may be limited to Y ($\leq$X) DL CCs. In this case, the UE needs to monitor DL signals/data transmitted through the Y CCs. In addition, even when the BS manages L UL CCs, a frequency bandwidth which can be received by a specific UE may be limited to M ($\leq$L) UL CCs. The limited DL/UL CCs for a specific UE are referred to as serving UL/DL CCs configured in the specific UE. The BS may allocate a prescribed number of CCs to the UE by activating some or all of the CCs managed by the BS or by deactivating some CCs managed by the BS. The BS may change the activated/deactivated CCs and change the number of activated/deactivated CCs. Various parameters for CA may be configured cell-specifically, UE group-specifically, or UE-specifically. Once the BS allocates available CCs to the UE cell-specifically or UE-specifically, at least one of the allocated CCs is not deactivated, unless overall CC allocation to the UE is reconfigured or the UE is handed over. Hereinafter, the CC that is not deactivated unless overall CC allocation to the UE is reconfigured is referred to as a Primary CC (PCC) and a CC that the BS can freely activate/deactivate is referred to as a Secondary CC (SCC). Single carrier communication uses one PCC for communication between the UE and the BS and does not use a SCC for communication. Meanwhile, the PCC and SCC may also be distinguished based on control information. For example, specific control information may be configured to be transmitted/received only through a specific CC. Such a specific CC may be referred to as a PCC and the other CC (or CCs) may be referred to as an SCC (or SCCs). For instance, control information transmitted on a PUCCH may correspond to such specific control information. Thus, if control information transmitted on the PUCCH can be transmitted to the BS from the UE only through the PCC, a UL CC in which the PUCCH of the UE is present may be referred to as a UL PCC and the other UL CC (or CCs) may be referred to as a UL SCC (SCCs). As another example, if a UE-specific CC is used, the specific UE may receive a DL Synchronization Signal (SS) from the BS as specific control information. In this case, a DL CC with which the specific UE establishes synchronization of initial DL time by receiving the DL SS (i.e. a DL CC used for attempting to access a network of the BS) may be referred to as a DL PCC and the other DL CC (or CCs) may be referred to as a DL SCC (or SCCs). In a 3GPP LTE(-A) communication system, multicarrier communication uses one PCC and no SCC or one or more SCCs per UE. However, this is the definition according to LTE(-A) and communication using multiple PCCs per UE may be permitted in the future. The PCC may be referred to as a primary CC, an anchor CC, or a primary carrier and the SCC may be referred to as a secondary CC or a secondary carrier.

Meanwhile, 3GPP LTE(-A) uses the concept of cells to manage radio resources. A cell is defined as a combination of DL resources and UL resources, that is, a combination of a DL CC and a UL CC. The cell can be configured of DL resources alone, or of both DL resources and UL resources. When CA is supported, a linkage between a carrier frequency of the DL resources (or DL CC) and a carrier frequency of the UL resources (or UL CC) may be indicated by system information. For example, a combination of the DL resources and the UL resources may be indicated by a System Information Block type 2 (SIB2) linkage. In FDD using different UL and DL operating bandwidths, different carrier frequencies are linked to constitute one serving CC (or one serving cell) and the SIB2 linkage indicates a frequency of a UL CC using a frequency different from a frequency of a DL CC accessed by the UE. In TDD using the same UL and DL operating bandwidth, one carrier frequency constitutes one serving CC and the SIB linkage indicates a frequency of a UL CC using the same frequency as a frequency of a DL CC accessed by the UE.

Here, the carrier frequency refers to a center frequency of each cell or CC. A cell that operates on a primary frequency (or PCC) may be referred to as a Primary Cell (PCell) and a cell(s) that operates on a secondary frequency (or SCC) may be referred to as a Secondary Cell(s) (SCell(s)). The primary frequency (or PCC) refers to a frequency (or CC) used for the UE to perform an initial connection establishment or connection re-establishment procedure. PCell may refer to a cell indicated during a handover process. The secondary frequency (or SCC) refers to a frequency (or CC) that is configurable after RRC connection establishment is performed and is usable to provide additional radio resources. The PCell and SCell may be collectively referred to as a serving cell. Accordingly, for a UE in an RRC_CONNECTED state, for which CA is not configured or CA is not supported, only one serving cell comprised of only the PCell is present. Meanwhile, for a UE in an RRC_CONNECTED state, for which CA is configured, one or more serving cells may be present and the serving cells may be configured to include one or more SCells as well as a PCell. However, in the future, the serving cells may be permitted to include a plurality of PCells. For CA, a network may configure one or more SCells for a UE that supports CA in addition to the PCell initially configured in the connection establishment procedure after an initial security activation procedure is initiated. However, even if the UE supports CA, the network may configure only the PCell for the UE, without adding the SCells.

Figure 6:
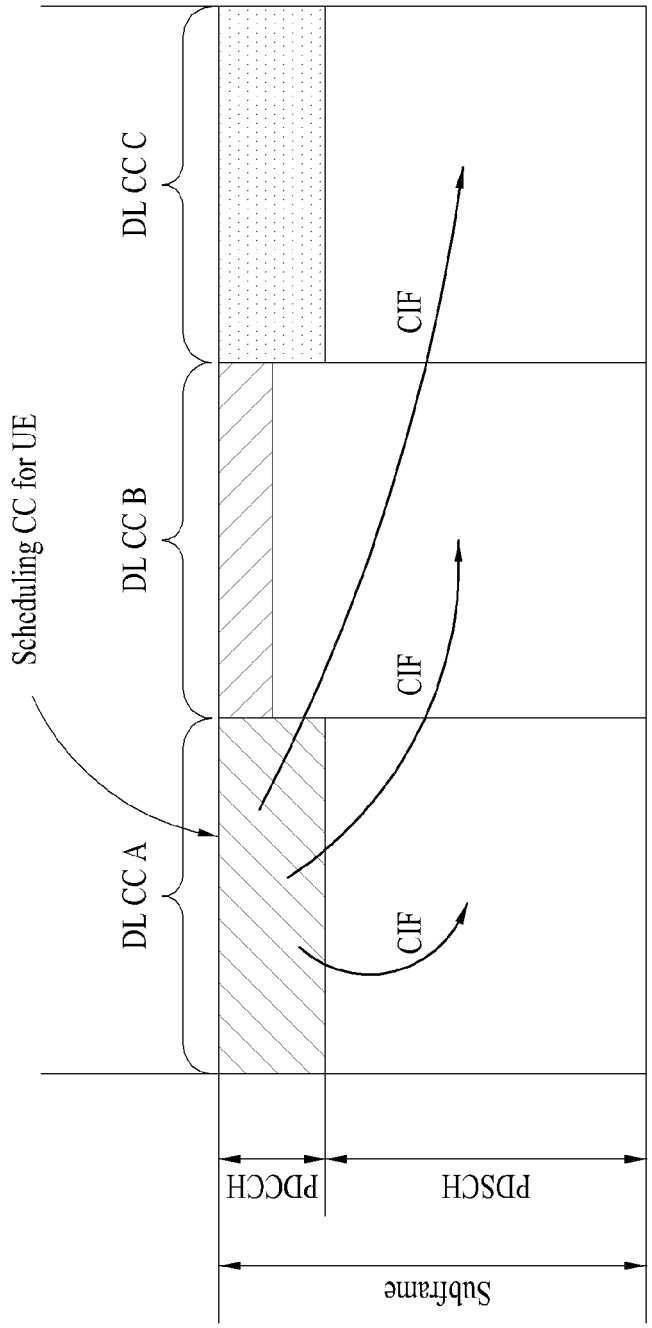
FIG. 6 illustrates exemplary DL scheduling when a plurality of carriers is aggregated.

FIG. 6 illustrates exemplary DL scheduling when a plurality of carriers is aggregated.

In case of communication using a single carrier, only one serving cell is present and, therefore, a PDCCH carrying a UL/DL grant and a PUSCH/PDSCH corresponding to the PDCCH are transmitted in the same cell. In other words, in case of FDD in a single carrier, a PDCCH for a DL grant for a PDSCH that is to be transmitted on a specific DL CC is transmitted on the specific DL CC and a PDCCH for a UL grant for a PUSCH that is to be transmitted on a specific UL CC is transmitted on a DL CC linked to the specific UL CC.

On the contrary, in a multicarrier system, a plurality of cells may be configured and, therefore, transmission of a UL/DL grant in a serving cell having a good channel state may be permitted. Thus, if a cell carrying the UL/DL grant which is scheduling information is different from a cell on which UL/DL transmission corresponding to the UL/DL grant is performed, this is referred to as cross-carrier scheduling. The 3GPP LTE(-A) system may support multicarrier aggregation and cross-carrier scheduling based on multicarrier aggregation, for data transmission rate improvement and stable control signaling.

Referring to FIG. 6, when cross-carrier scheduling (or cross-CC scheduling) is applied, a PDCCH for DL allocation for a DL CC B/C, i.e. a PDCCH carrying a DL grant, may be transmitted on a DL CC A and a PDSCH corresponding to the PDCCH may be transmitted on a DL CC B/C. A Carrier Indicator Field (CIF) may be introduced for cross-CC scheduling. Whether the CIF is present in the PDCCH may be indicated semi-statically and UE-specifically (or UE group-specifically) through higher layer signaling (e.g. RRC signaling). The baseline of PDCCH transmission is summarized as follows.

CIF disabled: PDCCH on a DL CC assigns PDSCH resources on the same DL CC or PUSCH resources on a single linked UL CC.
No CIF
Same as LTE PDCCH structure (same coding and same CCE-based resource mapping) and DCI format
CIF enabled: PDCCH on a DL CC can assign PDSCH/ PUSCH resources on a specific DL/UL CC among multiple aggregated DL/UL CCs using CIF.
Extended LTE DCI format with CIF
CIF (if configured) is a fixed x-bit field (e.g. x=3).
CIF (if configured) location is fixed regardless of DCI format size.
Reuse of LTE PDCCH structure (same coding and same CCE-based resource mapping)

One or more scheduling CCs may be configured for one UE and one of the scheduling CCs may be a PCC which is in charge of specific DL control signaling and UL PUCCH transmission. The scheduling CCs may be configured UE-specifically, UE-group-specifically, or cell-specifically. The scheduling CC may be configured so as to directly schedule at least itself. That is, the scheduling CC may become a scheduled CC thereof. Only one scheduling CC per scheduled CC may be configured. In other words, a plurality of scheduling CCs cannot be configured for one scheduled CC. In the present invention, a CC carrying a PDCCH is referred to as a scheduling CC or a Monitoring CC (MCC) and a CC carrying a PDSCH/PUSCH scheduled by the PDCCH is referred to as a scheduled CC.

The scheduling CC includes a DL CC as a part of all aggregated DL CCs. The UE detects/decodes the PDCCH only on corresponding DL CC. That is, during cross-CC scheduling, both DL and UL grant PDCCHs for scheduling PDSCH and PUSCH of the scheduling CC or scheduled CC may be transmitted/received only through the scheduling CC. A DL ACK/NACK channel (or a PHICH in case of 3GPP LTE(-A)) carrying ACK/NACK for the PUSCH transmitted through the scheduling CC or scheduled CC may be transmitted/received only through the scheduling CC. ACK/NACK for the PDSCH transmitted through the scheduling CC or scheduled CC may be transmitted/received on a UL control channel (a PUCCH in case of 3GPP LTE(-A)) or a UL data channel (a PUSCH in case of 3GPP LTE(-A)). The PUCCH may be transmitted on a PCC. In this case, the PDSCH/PUSCH of the scheduling CC or scheduled CC refers to a PDSCH/PUSCH configured/allocated to be transmitted on a corresponding CC. The ACK/NACK of the scheduling CC or scheduled CC refers to ACK/NACK for data transmitted on a corresponding CC.

In TDD, most communication standards up to now consider only multicarrier aggregation having the same DL-UL configuration. If a plurality of aggregated CCs operates in the same DL-UL configuration, since DL/UL subframe timings are the same on all CCs, a DL grant for a PDSCH of the scheduled CC to be transmitted in a specific DL subframe may be transmitted/received through the scheduling CC in the specific DL subframe.

However, in consideration of the difference in UL/DL load on each CC and the difference in channel state on each CC, it is preferable to permit a different DL-UL configuration per CC. If a plurality of CCs operating in different DL-UL configurations are aggregated and cross-CC scheduling is supported based on the aggregated CCs, a UL subframe timing of the scheduling CC may differ from a UL subframe timing of the scheduled CC. In other words, the scheduling CC and the scheduled CC in the same time resource duration may operate not as DL and DL or UL and UL but as UL and DL or DL and UL.

FIG. 7 illustrates an exemplary scheduling CC and scheduled CC having different TDD DL-UL configurations. Especially, FIG. 7 illustrates a radio frame in which the scheduling CC operates in DL-UL configuration #1 of Table 1 and the scheduled CC operates in DL-UL configuration #2 of Table 1. In FIG. 7, D, U, and S denote a DL subframe, a UL subframe, and a special subframe, respectively. In other words, D represents that a corresponding CC operates as DL and U represents that a corresponding CC operates as UL.

Referring to FIG. 7, in a subframe corresponding to a SubFrame Number (SFN) 0, 1, or 4, since the scheduling CC and the scheduled CC are configured as all Ds or Ss, a DL grant for the scheduled CC may be transmitted through the scheduling CC without any restrictions. However, if the scheduling CC is configured as U and the scheduled CC is configured as D as in an SFN 3, a PDCCH for scheduling the scheduled CC needs to be allocated in a subframe prior to a PDSCH of the scheduled CC. A DL grant for DL data allocated to the scheduled CC should be positioned before the DL data in the time domain (or time axis). However, if the scheduling CC operates as UL in a subframe, the DL grant cannot be transmitted/received in a control region of the corresponding subframe. Hereinafter, a scheduling scheme in which the DL grant is transmitted/received in a subframe prior to a data channel scheduled by the DL grant will be referred to as predictive scheduling. For example, according to predictive scheduling, in order to schedule the PDSCH of the scheduled CC in the SFN 3, scheduling information for the PDSCH is transmitted/received in SFN 0 and/or SFN 1 which precedes SFN 3 and has the scheduling CC configured as D (or S).

To achieve predictive scheduling, the present invention proposes insertion of a Downlink Subframe Indicator (DSI) to a PDCCH through which predictive scheduling can be performed. The DSI indicates a subframe to which a DL grant of a corresponding PDCCH relates among DL subframes in which a PDSCH can be transmitted/received. A legacy 3GPP LTE(-A) system permits only one PDCCH transmission/reception for one UE on one CC of one DL subframe. That is, according to legacy 3GPP LTE(-A), a plurality of PDSCHs for one UE, which is to be transmitted in different subframes on one CC, cannot be scheduled in one DL subframe. Contrarily, in the present invention, a plurality of PDSCHs, which is to be transmitted to one UE (or UE group) in a plurality of subframes, can be scheduled by one DL subframe on one CC.

The present invention proposes the following two options so that a PDCCH for scheduling a plurality of DL subframes may be transmitted/received in one DL subframe.

Option 1: Option 1 makes it possible to detect a plurality of PDCCHs for a scheduled CC in a specific DL subframe (a subframe D (or S) configured by a higher layer signal or a predetermined subframe). For example, referring to FIG. 7, a UE is permitted to detect a plurality of PDCCHs for scheduling SFNs 1 and 3 or SFNs 6 and 8 of the scheduled CC only in an SFN 0 or 1 or an SFN 5 or 6. Option 1 of the present invention has an advantage of using a format almost the same as an existing PDCCH format except that only a DSI is added to the existing PDCCH format. In this case, a Downlink Assignment Index (DAI) field in a DL grant DCI format may be used as the DSI.

Option 2: Option 2 makes it possible to detect a PDCCH for scheduling a plurality of PDSCHs of a scheduled CC and/or a scheduling CC in a specific DL subframe (a subframe D (or S) configured by a higher layer signal or a predetermined subframe). An existing PDCCH or a PDCCH of Option 1 can schedule only one PDSCH. Contrarily, according to Option 2 of the present invention, one PDCCH can schedule a plurality of PDSCHs and, therefore, a DCI format for a DL grant PDCCH of Option 2 may have a larger size than a DCI format for the existing PDCCH or a DCI format for the PDCCH of Option 1. According to Option 2, a plurality of PDSCHs is scheduled using one PDCCH by the UE.

In Option 2, a Resource Allocation (RA) field may be commonly applied to a plurality of PDSCHs in order to reduce increase of payload of a corresponding PDCCH.

In Option 2, an ACK/NACK resource for reception of a plurality of PDSCHs may be implicitly derived from one PDCCH. In a 3GPP LTE system, a PUCCH resource for ACK/NACK is not pre-allocated to each UE. Instead, a plurality of UEs in coverage of a BS dividedly uses a plurality of PUCCH resources at every time point. More specifically, a PUCCH resource used by the UE to transmit ACK/NACK corresponds to a PDCCH carrying scheduling information about corresponding DL data. An entire region in which a PDCCH is transmitted in each DL subframe includes a plurality of Control Channel Elements (CCEs). A PDCCH transmitted to the UE is comprised of one or more CCEs. A CCE is a logical assignment unit used to provide a coding rate based on a radio channel state to the PDCCH. The CCE corresponds to a plurality of Resource Element Groups (REGs) each consisting of a predefined number of REs (e.g. 4 REs). The UE transmits ACK/NACK through a PUCCH resource corresponding to a specific CCE among CCEs constituting a PDCCH received thereby. For example, if a corresponding PDCCH schedules two PDSCHs according to Option 2 of the present invention, a UL ACK/NACK resource for the first PDSCH (of a preceding subframe) uses a resource '$n_{CCE}$' linked to the first CCE of the PDCCH and a UL ACK/NACK resource for the second PDSCH may be transmitted/received using '$n_{CCE}+1$'.

A subframe to which Option 1 or 2 is applied may be configured by higher layer (e.g. RRC layer) signaling. The UE may receive, through higher layer signaling, information indicating a specific subframe in which a plurality of PDCCHs for the scheduled CC or one PDCCH for scheduling a plurality of PDSCHs on the scheduled CC is transmitted/received. Meanwhile, a subframe to which Option 1 or 2 is applied may be previously determined. Hereinbelow, the subframe to which the above-described Option 1 or Option 2 can be applied is defined.

FIG. 8 illustrates exemplary cases generated between a frame of a scheduling CC and a frame of a scheduled CC when the scheduling CC and the scheduled CC having different TDD DL-UL configurations are combined.

Assuming that two different configurations among the DL-UL configurations of Table 1 are respectively used for a scheduling CC and a scheduled CC, cases of FIG. 8 may be considered by all possible combinations of the DL-UL configurations of Table 1. In Case 1, a scheduling CC and a scheduled CC in a K-th subframe are U and D, respectively. In Case 2, scheduling CCs in a K-th subframe and a contiguous (K+1)-th subframe are all U and scheduled CCs therein are all D. In Case 3 and Case 4, scheduling CCs in a K-th subframe and contiguous (K+1)-th and (K+2)-th subframes are all U and scheduled CCs therein are all D. In FIG. 8, a parameter 'i' represents an interval between a subframe, which equals a K-th subframe or the foremost subframe in which a scheduling CC is configured as D (or S), and the K-th subframe. According to a combination of a DL-UL configuration of the scheduling CC and a DL-UL configuration of the scheduled CC, i may be 1, 2, 3, or 4. The following scheduling method may be applied to each case.

Method 1: Concentration Scheduling

In Case 1 to Case 4, DL grants for DL data to be transmitted/received through the scheduled CCs in the K-th, (K+1)-th, and (K+2)-th subframes may be all transmitted/received through the scheduling CC in a (K−i)-th subframe. In Case 1, a DSI for discriminating a subframe related to a corresponding DL grant from among the (K−i)-th and K-th subframes may be signaled through the scheduling CC in the (K−i)-th subframe. In Case 2, a DSI for discriminating a subframe related to a corresponding DL grant from among the (K−i)-th, K-th, and (K+1)-th subframes may be signaled through the scheduling CC in the (K−i)-th subframe. In Case 3 and Case 4, a DSI for discriminating a subframe related to a corresponding DL grant from among the (K−i)-th, K-th, (K+1)-th, and (K+2)-th subframes may be signaled through the scheduling CC in the (K−i)-th subframe.

Method 2: Distributed Scheduling

In Case 1, a DL grant for the K-th subframe of the scheduled CC may be transmitted/received through the scheduling CC in the (K−i)-th subframe. In this case, a DSI for discriminating a subframe related to a corresponding DL grant from among the (K−i)-th and K-th subframes of the scheduled CC may be signaled from the BS to the UE through the scheduling CC in the (K−i)-th subframe.

FIG. 9 illustrates an example of applying Method 2 of the present invention to Case 2 of FIG. 8.

In Case 2, DL grants for the K-th and (K+1)-th subframes of the scheduled CC may be transmitted/received through the scheduling CC in the (K−i−1)-th and (K−i)-th subframes, respectively. In this case, referring to FIG. 9(a), a DSI for discriminating a subframe related to a corresponding DL grant from among the (K−i−1)-th and K-th subframes of the scheduled CC may be signaled from the BS to the UE through the scheduling CC in the (K−i−1)-th subframe and a DSI for discriminating a subframe related to a corresponding DL grant from among the (K−i)-th and (K+1)-th subframes of the scheduled CC may be signaled from the BS to the UE through the scheduling CC in the (K−i)-th subframe. Alternatively, DL grants for the K-th and (K+1)-th subframes of the scheduled CC may be transmitted/received through the scheduling CC in the (K−i)-th and (K−i−1)-th subframes, respectively. In this case, referring to FIG. 9(b), a DAI for discriminating a subframe related to a corresponding DL grant from among the (K−i−1)-th and (K+1)-th subframes of the scheduled CC may be signaled from the BS to the UE through the scheduling CC in the (K−i−1)-th subframe and a DSI for discriminating a subframe related to a corresponding DL grant from among the (K−i)-th and K-th subframes of the scheduled CC may be signaled from the BS to the UE through the scheduling CC in the (K−i)-th subframe.

FIG. 10 illustrates an example of applying Method 2 of the present invention to Case 3 of FIG. 8.

In Case 3, DL grants for the K-th, (K+1)-th, and (K+2)-th subframes of the scheduled CC may be transmitted/received through the scheduling CC in the (K−i−2)-th, (K−i−1)-th, and K-th subframes, respectively. In this case, referring to FIG. 10, a DSI for discriminating a subframe related to a corresponding DL grant from among the (K−i−2)-th and K-th subframes from among the scheduled CC may be signaled from the BS to the UE through the scheduling CC in the (K−i−2)-th subframe. A DSI for discriminating a subframe related to a corresponding DL grant from among the (K−i−1)-th and (K+1)-th subframes may be signaled from the BS to the UE through the scheduling CC in the (K−i−1)-th subframe. A DAI for discriminating a subframe related to a corresponding DL grant from among the (K−i)-th and (K+2)-th subframes may be signaled from the BS to the UE through the scheduling CC in the (K−ith subframe.

FIG. 11 illustrates an example of applying Method 2 of the present invention to Case 4 of FIG. 8.

In Case 4, DL grants for the K-th and (K+1)-th subframes of the scheduled CC may be transmitted/received through the scheduling CC in the (K−i−1)-th subframe. A DL grant for the (K+2)-th subframes of the scheduled CC may be transmitted/received through the scheduling CC in the (K−i)-th subframe. In this case, referring to FIG. 11(a), a DSI for discriminating a subframe related to a corresponding DL grant from among the (K−i−1)-th, K-th, and (K+1)-th subframes may be signaled from the BS to the UE through the scheduling CC in the (K−i−1)-th subframe. A DSI for discriminating a subframe related to a corresponding DL grant from among the (K−i)-th and (K+2)-th subframes may be signaled from the BS to the UE through the scheduling CC in the (K−i)-th subframe. Alternatively, a DL grant for the K-th subframe of the scheduled CC may be transmitted/received through the scheduling CC in the (K−i−1)-th subframe. DL grants for the (K+1)-th and (K+2)-th subframes of the scheduled CC may be transmitted/received through the scheduling CC in the (K−i)-th subframe. In this case, referring to FIG. 11(b), a DSI for discriminating a subframe related to a corresponding DL grant from among the (K−i−1)-th and K-th subframes may be signaled from the BS to the UE through the scheduling CC in the (K−i−1)-th subframe. A DAI for discriminating a subframe related to a corresponding DL grant from among the (K−i)-th, (K+1)-th, and (K+2)-th subframes may be signaled from the BS to the UE through the scheduling CC in the (K−i)-th subframe.

For reference, similarly to Case 3 and Case 4, the numbers of DL subframes of the scheduled CC scheduled in each DL subframe of the scheduling CC may vary. That is, an embodiment in which the number of DL grants in each DL subframe of the scheduling CC is different may be carried out.

The above-described Method 1 and Method 2 may be applied both to Option 1 and Option 2 of the present invention.

Meanwhile, a DL subframe, which is configured such that DL grants for multiple DL assignment are transmitted/received therein according to the above-described Method 1 and Method 2, may be a special subframe having fewer DwPTS symbols. For example, referring to Table 2, a DL subframe configured for multiple DL assignment according to Option 1 or Option 2 of the present invention may be a special subframe of a normal CP defined in configuration #0 or #5 among special subframe configurations or may be a special subframe of an extended CP defined in configuration #0 or #4 among the special subframe configurations. In this way, only a PDCCH may be transmitted/received in a subframe including fewer DwPTS symbols and a PDSCH cannot be transmitted/received. In this case, a DSI need not to be added to a DL grant for a corresponding subframe. For example, referring to FIG. 9(a), if the (K−i)-th subframe is a special subframe having fewer DwPTS symbols, since DL data cannot be transmitted in the (K−i)-th subframe, only a DL grant for the (K+1)-th subframe can be transmitted/received in the (K−i)-th subframe and the DL grant transmitted in the (K−i)-th subframe always serves as scheduling information for the (K−i)-th subframe. Accordingly, the BS need not transmit the DSI indicating a subframe with which a DL grant transmitted in the (K−i)-th subframe is associated. Even though the BS transmits the DSI, the UE need not read the DSI in a corresponding subframe.

Meanwhile, since, in TDD mode, the same frequency band is dividedly used as a DL subframe and a UL subframe in the time domain, more DL subframes than UL subframes may be allocated or more UL subframes than DL subframes may be allocated in an asymmetric DL/UL data traffic situation. Accordingly, in TDD mode, DL subframes and UL subframes may not be in one-to-one correspondence. Especially, if the number of DL subframes is greater than the number of UL subframes, a situation occurs in which the UE should transmit, in one UL subframe, ACK/NACK responses for a plurality of PDSCHs transmitted in a plurality of DL subframes. For example, a relationship of DL subframes: UL subframes=M:1 may be configured according to a TDD configuration. M is the number of DL subframes corresponding to one UL subframe. At this time, the UE should transmit, in one UL subframe, ACK/NACK responses to a plurality of PDSCHs in M DL subframes.

Specifically, an ACK/NACK signal transmitted in a UL subframe n corresponds to a PDCCH(s) detected by a UE in a DL subframe(s) n−k (k∈K) and a DL SPS release PDCCH. K is given by a UL-DL configuration. Table 4 shows K: $\{k_0, k_1, \ldots, k_{M-1}\}$ defined in 3GPP LTE(-A) TDD.

TABLE 4

| DL-UL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | — | 7 | — |

If a plurality of PDSCHs is transmitted to one UE in a plurality of DL subframes, the BS transmits a plurality of PDCCHs, one PDCCH per PDSCH. In this case, the UE transmits ACK/NACK signals for the plural PDSCHs through a PUCCH or PUSCH in one UL subframe.

If the UE misses some PDCCH(s) transmitted by the BS in a plurality of subframes, an error may occur during generation of ACK/NACK because the UE cannot know the fact that PDSCHs corresponding to the missed PDCCHs are transmitted. To solve such an error, a DAI is included in a PDCCH in a 3GPP LTE(-A) TDD system. The DAI represents an accumulated value (i.e. a counting value) of PDCCH(s) corresponding to PDSCH(s) up to current subframes in DL subframes n−k (k∈K) and PDCCH(s) indicating a DL SPS release.

Figure 12:
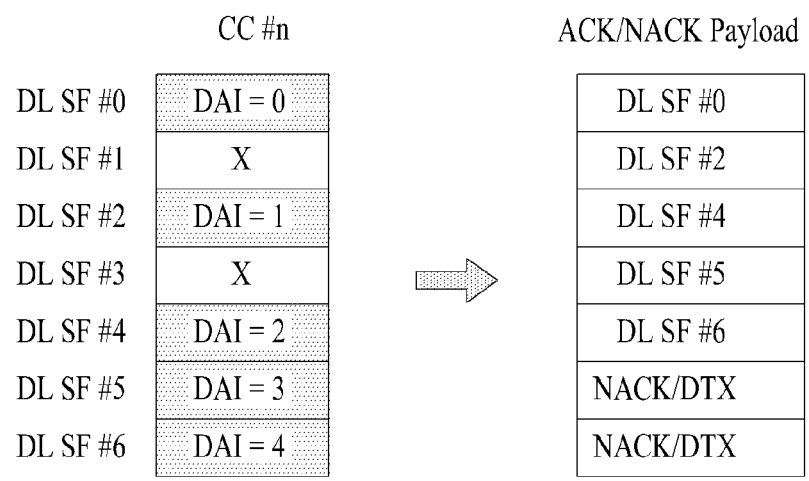
FIG. 12 illustrates an ACK/NACK payload for one CC.

FIG. 12 illustrates an ACK/NACK payload for one CC. In FIG. 12, DL SF #0 to DL SF #6 are numbers assigned to distinguish between DL subframes and it is assumed that each bit of the ACK/NACK payload for one CC corresponds to each DL subframe. It is also assumed that, in FIG. 12, DL subframes:UL subframes (M:1)=7:1 and the BS schedules five PDSCHs for the UE. If multiple data is transmitted through a corresponding CC in a DL subframe, the number of ACK/NACK bits for each DL subframe may be greater than 1. For example, if DL subframes are configured such that a maximum of two codewords may be transmitted through a corresponding CC in each DL subframe, the size of the ACK/NACK payload is twice the number of DL subframes associated with a corresponding ACK/NACK transmission time point.

Referring to FIG. 12, in order to transmit DL data in DL SFs #0, #1, #4, #5, and #6 through CC #n to the UE, the BS transmits a DL grant for DL data which is to be transmitted in each DL subframe through a scheduling CC to the UE. The BS transmits a DAI indicating an accumulated value of PDCCHs transmitted in the corresponding subframes to the UE on a PDCCH together with the DL grant. The UE detects an ACK/NACK/Discontinuous Transmission (DTX) for DL data assigned in CC #n and generates an ACK/NACK payload for CC #n. ACK/NACK for DL data in the ACK/NACK payload for CC #n may be arranged in order of DAI (i.e. a scheduled order value of DL data) signaled in the PDCCH carrying a DL grant for scheduling corresponding DL data. A value indicating NACK/DTX may be configured in bits corresponding to the other DL subframes of the ACK/NACK payload.

Figure 13:
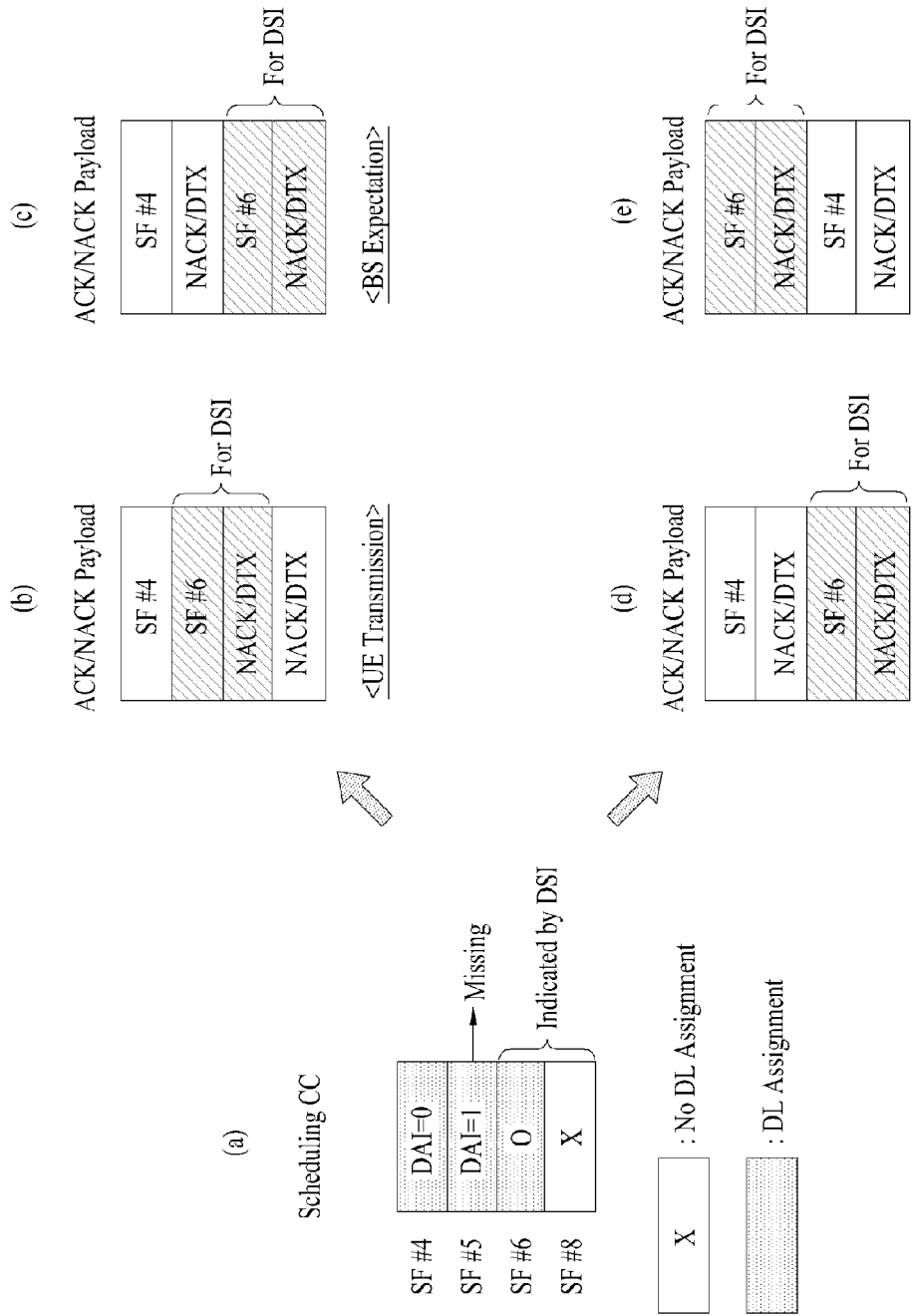
FIG. 13 illustrates an ACK/NACK payload of a scheduled CC according to the present invention.

FIG. 13 illustrates an ACK/NACK payload of a scheduled CC according to the present invention.

As proposed in Option 1 of the present invention, if a DAI field is used as a DSI, the location of ACK/NACK for DL data which is indicated by a DSI and transmitted through the scheduled CC in the ACK/NACK payload for the scheduled CC is problematic.

The present invention proposes that ACK/NACKs for subframes indicated by DSIs be arranged at a fixed location in the ACK/NACK payload for the scheduled CC, for example, in a Most Significant Bit (MSB) part or a Least Significant Bit (LSB) part. To this end, a DL grant to which a DSI is applied may be excluded in determining a DAI value. That is, when DL grants are counted in scheduling order, DL grants except for DL grants to which the DSI is applied may be sequentially counted. In addition, in the ACK/NACK payload except for the part (e.g. MSB or LSB part) at which ACK/NACKs for DL data indicated by the DSI are arranged, ACK/NACKs for DL data indicated by the DAI may be arranged in order of DAI values. ACK/NACKs corresponding to DSIs in the MSB or LSB part may be arranged in order of time of subframes in which corresponding DL data is transmitted.

Referring to FIG. 13, it is assumed that a scheduling CC operates in DL-UL configuration #1 of Table 1, a scheduled CC operates in DL-UL configuration #2, and ACK/NACKs for subframes SFs #4, 5, 6, and 8 are transmitted through one PUCCH or one PUSCH. In this case, referring to FIG. 7, a DL grant for DL data transmitted in SF #8 should be transmitted/received in a DL subframe prior to SF #8 rather in SF #8. A DSI of the present invention is transmitted by the BS to the UE so as to distinguish between SF #6 and SF #8. In FIG. 13, it is assumed that a DL grant for SF #6 and a DL grant of the SF #8 of the scheduled CC are transmitted in SF #6. The BS transmits a DL grant of DAI=0 for the scheduled CC in SF #4 through the scheduling CC and transmits DL data corresponding to the DL grant to the UE through the scheduling CC in subframe #4. The BS transmits a DL grant of DAI=1 for the scheduled CC in SF #5 through the scheduling CC and transmits DL data corresponding to the DL grant to the UE through the scheduling CC in subframe #5. The BS transmits a DL grant having a DSI configured to indicate SF #6 through the scheduling CC in SF #6 and transmits DL data corresponding to the DL grant to the UE through the scheduling CC in subframe #6. In SF #8, no DL data for the UE is transmitted from the BS.

The UE receives DL grants and/or DL data in SFs #4, #5, #6, and #8, generates an ACK/NACK response to each subframe, and generates an ACK/NACK payload to be transmitted to the BS at a corresponding ACK/NACK transmission time point. If the UE misses a DL grant of DAI=1 in SF #5, the UE does not know the presence of DL data scheduled by a PDCCH of DAI=1. Accordingly, if ACK/NACK bits are arranged in order of subframes indicated by DSIs after ACK/NACK bits are arranged in order of DAIs, the UE will form an ACK/NACK payload as shown in FIG. 13(b). On the other hand, since the BS has transmitted a DL grant of DAI=0 and a DL grant of DAI=1, the BS will expect to receive an ACK/NACK payload in which ACK/NACKs for DL subframes are arranged as in FIG. 13(c) from the UE. If the last transmitted DAI is missed, an ACK/NACK location for DL data in the ACK/NACK payload is differently recognized in the BS and the UE.

According to an embodiment of the present invention, if ACK/NACKs corresponding to DSIs are arranged in the MSB part of the ACK/NACK payload for the scheduled CC as shown in FIG. 13(d) or in the LSB part of the ACK/NACK payload for the scheduled CC as shown in FIG. 13(e), the BS and the UE identically recognize the ACK/NACK location for DL data in the ACK/NACK payload.

Meanwhile, if ACK/NACK corresponding to a DSI is transmitted on a PUCCH or PUSCH, it is also possible to arrange all ACK/NSCKs including the ACK/NACK corresponding to the DSI in the ACK/NACK payload for the scheduled CC associated with the DSI in time order of subframes in which DL data is transmitted rather than in order of DAI values. That is, in the ACK/NACK payload including the ACK/NACK corresponding to the DSI, all ACK/NACKs may be arranged in order of subframes in which DL data is transmitted. In addition, all ACK/NACKs may be arranged in the ACK/NACK payload in time order of subframes in which corresponding DL data is transmitted, irrespective of whether the ACK/NACK payload for a corresponding CC includes the ACK/NACK corresponding to the DSI.

The aforementioned embodiments related to the ACK/NACK payload may be applied to an ACK/NACK payload for at least a scheduled CC.

Figure 14:
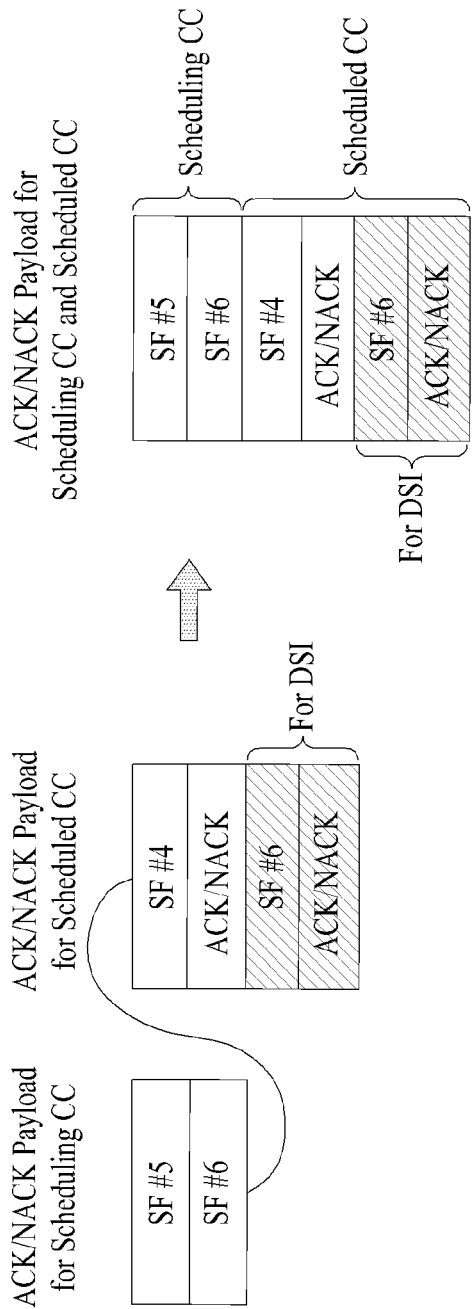
FIG. 14 illustrates an ACK/NACK payload for a plurality of CCs.

FIG. 14 illustrates an ACK/NACK payload for a plurality of CCs.

If ACK/NACKs for a plurality of CCs should be transmitted through one PUCCH or PUSCH at one ACK/NACK transmission time point, an ACK/NACK payload for the plural CCs may be generated by concatenating ACK/NACK payloads, each of which is generated per CC according to the method described with reference to FIG. 12 or FIG. 13, in order of CC indexes.

Referring to FIG. 14, it is assumed that ACK/NACK corresponding to a DSI is located in an end part in an ACK/NACK payload of a corresponding CC and ACK/NACK payloads, each of which is generated per CC, are concatenated in order of CC indexes. If a CC index of a scheduling CC is less than a CC index of a scheduled CC, an ACK/NACK payload of the scheduled CC is concatenated after an ACK/NACK payload for the scheduling CC and an ACK/NACK payload for a plurality of CCs, which is to be transmitted on one PUCCH or PUSCH at one ACK/NACK transmission time point, may be generated.

If cross-carrier scheduling is performed using a DSI according to the proposed method of the present invention, ACK/NACK information transmitted through a PUCCH may be transmitted by PUCCH format 3 out of channel selection and PUCCH format 3. In this case, an ACK/NACK payload to be transmitted in PUCCH format 3 may be configured according to any one of the above-described embodiments.

The methods of the present invention proposed above may be applied to each of a plurality of scheduled CCs having different DL-UL configurations. In other words, if a plurality of scheduled CCs have different DL-UL configurations from a PCC, the proposed methods of the present invention may be individually applied to each scheduled CC and a scheduling CC. Namely, in terms of one scheduled CC, if the scheduled CC has a different DL-UL configuration from the scheduling CC, the proposed methods of the present invention may be applied.

Figure 15:
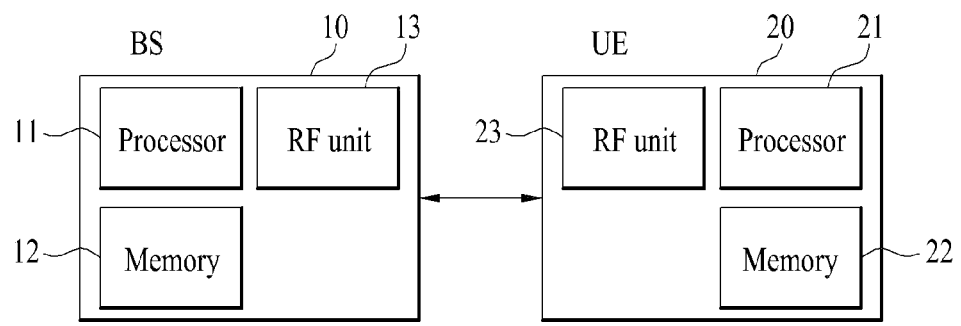
FIG. 15 is a block diagram illustrating elements of a BS 10 and a UE 20 by which the present invention is performed.

FIG. 15 is a block diagram illustrating elements of a BS 10 and a UE 20 by which the present invention is performed.

In the above methods of the present invention, the BS 10 may be a transmission entity of DL grant and DL data and the UE 20 may be a transmission entity of UL ACK/NACK.

The BS 10 and the UE 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers.

The processors 11 and 21 control the overall operation of various modules in the BS or UE. The processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the BS codes and modulates signals and/or data scheduled by the processor or a scheduler connected to the processor 11 to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

The processor 11 of the BS 10 may control the RF unit 13 so that DL grants for scheduling one or more PDSCHs which are transmitted to the UE 20 through a scheduled CC according to any one of the above-described methods of the present invention and DSIs indicating subframes of the scheduled CC associated with the DL grants may be transmitted in a DL subframe of a scheduling CC. The processor 11 may control the RF unit 13 so that PDSCHs may be transmitted to the UE 20 according to the DL grants and DSIs. If the DL subframe of the scheduling CC available for transmission/reception of DL grants for multiple DL subframes of the scheduled CC are previously determined, information indicating the DL subframe of the scheduling CC need not be additionally signaled between the BS 10 and the UE 20. If the DL subframe of the scheduling CC available for transmission/reception of the DL grants for the multiple DL subframes of the scheduled CC is configured by a higher layer, the processor 11 may control the RF unit 13 so that information indicating the DL subframe of the scheduling CC may be transmitted to the UE 20.

A signal processing process of the UE 20 is the reverse of the signal processing process of the BS 10. Under the control of the processor 21, the RF unit 23 of the UE 10 receives radio signals transmitted by the BS 10. The RF unit 23 may include $N_r$ receive antennas and frequency down-converts each of signals received through receive antennas into a baseband signal. The processor 21 decodes and demodulates the radio signals received through the receive antennas and restores data that the BS 10 originally desired to transmit.

The processor 21 of the UE 20 may control the RF unit 23 so that DL grants for scheduling one or more PDSCHs which are transmitted by the BS 10 to the UE through a scheduled CC according to any one of the above-described methods of the present invention and DSIs indicating subframes of the scheduled CC associated with the DL grants may be received in a DL subframe of a scheduling CC. If a DL subframe of a scheduling CC available for transmission/reception of the DL grants for the multiple DL subframes of the scheduled CC is configured by a higher layer, the processor 21 may control the RF unit 23 so that information indicating the DL subframe of the scheduling CC may be received from the BS 10. The processor 21 may control the RF unit 23 so as to detect DL grants for one or more DL subframes of the scheduled CC by attempting blind detection on the scheduling CC of a DL subframe which is previously determined according to the methods of the present invention or determined by higher layer signaling. The processor 21 may control the RF unit 23 so as to receive a corresponding PDSCH through the scheduled CC according to the DL grants and DSIs. In addition, the processor 21 may generate an ACK/NACK payload for the scheduling CC and/or scheduled CC according to any one of the aforementioned methods of the present invention. The processor 21 may control the RF unit 23 so as to transmit the ACK/NACK payload to the BS 10 through a PUCCH or PUSCH.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the UE 20. A Reference Signal (RS) transmitted in correspondence to a corresponding antenna defines an antenna viewed from the UE 20 and enables the UE 20 to perform channel estimation for the antenna, irrespective of whether a channel is a single radio channel from one physical channel or a composite channel from a plurality of physical antennas including the antenna. That is, an antenna is defined such that a channel for transmitting a symbol on the antenna can be derived from the channel through which another symbol on the same antenna is transmitted. An RF unit for supporting a Multi-Input Multi-Output (MIMO) function of transmitting and receiving data using a plurality of antennas may be connected to two or more antennas.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a BS, a UE, or other equipment in a wireless communication system.

The invention claimed is:

1. A method for receiving, by a user equipment in which a plurality of cells is configured, a downlink signal from a base station, comprising:

receiving, in a downlink subframe D1 of a first cell among the plurality of cells, control information about downlink data assigned to a second cell different from the first cell among the plurality of cells and indication information indicating a downlink subframe D2 to which the downlink data is assigned; and receiving the downlink data through the second cell in the downlink subframe D2 from the base station according to the control information and the indication information, wherein the first cell and the second cell have different time division duplex (TDD) uplink-downlink configurations according to which, in at least one subframe duration, one of the first and second cells have a downlink subframe and the other one of the first and second cell have a uplink subframe, and wherein the downlink subframe D1, in which the control information and the indication information is received, is equal to or precedes the downlink subframe D2, in which the downlink data according to the control information is received, in a time domain.

2. The method according to claim 1, wherein the downlink subframe D1 is configured to be available for reception of two or more downlink control channels respectively corresponding to two or more downlink subframes of the second cell or configured to be available for reception of one downlink control channel for the two or more downlink subframes of the second cell.

3. The method according to claim 1, further comprising:

transmitting ACKnowledgement (ACK)/Negative ACK (NACK) for the downlink data received in the downlink subframe D2 indicated by the indication information to the base station, wherein the ACK/NACK is located at an end part or a front part of ACK/NACK information configured for the second cell.

4. A method for transmitting, by a base station, a downlink signal to a user equipment in which a plurality of cells is configured, comprising:

transmitting, in a downlink subframe D1 of a first cell among the plurality of cells, control information about downlink data assigned to a second cell different from the first cell among the plurality of cells and indication information indicating a downlink subframe D2, to which the downlink data is assigned, to the user equipment; and transmitting the downlink data through the second cell in the downlink subframe D2 to the user equipment according to the control information and the indication information, wherein the first cell and the second cell have different time division duplex (TDD) uplink-downlink configurations according to which, in at least one subframe duration, one of the first and second cells have a downlink subframe and the other one of the first and second cell have a uplink subframe, and wherein the downlink subframe D1, in which the control information and the indication information is transmitted, is equal to or precedes the downlink subframe D2, in which the downlink data according to the control information is transmitted, in a time domain.

5. The method according to claim 4, wherein the downlink subframe D1 is configured to be available for transmission of two or more downlink control channels respectively corresponding to two or more downlink subframes of the second cell or configured to be available for transmission of one downlink control channel for the two or more downlink subframes of the second cell.

6. The method according to claim 4, further comprising:
receiving ACKnowledgement(ACK)/Negative ACK (NACK) for the downlink data transmitted in the downlink subframe D2 indicated by the indication information from the user equipment,
wherein the ACK/NACK is located at an end part or a front part of ACK/NACK information configured for the second cell.

7. A user equipment in which a plurality of cells is configured, for receiving a downlink signal from a base station, comprising:
a Radio Frequency (RF) unit configured to transmit and receive a radio signal; and
a processor configured to control the RF unit,
wherein the processor controls the RF unit to receive, in a downlink subframe D1 of a first cell among the plurality of cells, control information about downlink data assigned to a second cell different from the first cell among the plurality of cells and indication information indicating a downlink subframe D2 to which the downlink data is assigned and controls the RF unit to receive the downlink data through the second cell in the downlink subframe D2 from the base station according to the control information and the indication information, and
wherein the first cell and the second cell have different time division duplex (TDD) uplink-downlink configurations according to which, in at least one subframe duration, one of the first and second cells have a downlink subframe and the other one of the first and second cell have a uplink subframe, and
wherein the downlink subframe D1, in which the control information and the indication information is received, is equal to or precedes the downlink subframe D2, in which the downlink data according to the control information is received, in a time domain.

8. The user equipment according to claim 7, wherein the downlink subframe D1 is configured to be available for reception of two or more downlink control channels respectively corresponding to two or more downlink subframes of the second cell or configured to be available for reception of one downlink control channel for the two or more downlink subframes of the second cell.

9. The user equipment according to claim 7, wherein the processor controls the RF unit to transmit ACKnowledgement(ACK)/Negative ACK (NACK) for the downlink data received in the downlink subframe D2 indicated by the indication information to the base station, and
wherein the ACK/NACK is located at an end part or a front part of ACK/NACK information configured for the second cell.

10. A base station for transmitting a downlink signal to a user equipment in which a plurality of cells is configured, comprising:
a Radio Frequency (RF) unit configured to transmit and receive a radio signal; and
a processor configured to control the RF unit,
wherein the processor controls the RF unit to transmit, in a downlink subframe D1 of a first cell among the plurality of cells, control information about downlink data assigned to a second cell different from the first cell among the plurality of cells and indication information indicating a downlink subframe D2, to which the downlink data is assigned, to the user equipment and controls the RF unit to transmit the downlink data through the second cell in the downlink subframe D2 to the user equipment according to the control information and the indication information, and
wherein the first cell and the second cell have different time division duplex (TDD) uplink-downlink configurations according to which, in at least one subframe duration, one of the first and second cells have a downlink subframe and the other one of the first and second cell have a uplink subframe, and
wherein the downlink subframe D1, in which the control information and the indication information is transmitted, is equal to or precedes the downlink subframe D2, in which the downlink data according to the control information is transmitted, in a time domain.

11. The base station according to claim 10, wherein the downlink subframe D1 is configured to be available for transmission of two or more downlink control channels respectively corresponding to two or more downlink subframes of the second cell or configured to be available for transmission of one downlink control channel for the two or more downlink subframes of the second cell.

12. The base station according to claim 10,
wherein the processor controls the RF unit to receive ACKnowledgement(ACK)/Negative ACK (NACK) for the downlink data transmitted in the downlink subframe D2 indicated by the indication information from the user equipment, and
wherein the ACK/NACK is located at an end part or a front part of ACK/NACK information configured for the second cell.

* * * * *